United States Patent [19]

Callahan et al.

[11] 4,236,215
[45] Nov. 25, 1980

[54] VEHICULAR DATA HANDLING AND CONTROL SYSTEM

[75] Inventors: Bernard E. Callahan, Hoffman Estates; George A. Carlson, Elk Grove Village; Richard N. Daniels, Wooddale; Richard H. Noens, Arlington Heights; Richard A. Stumpf, Des Plaines; Richard H. Kruse, Deerfield, all of Ill.

[73] Assignee: Vapor Corporation, Chicago, Ill.

[21] Appl. No.: 954,925

[22] Filed: Oct. 26, 1978

[51] Int. Cl.³ .............................................. B60L 3/00
[52] U.S. Cl. .................................... 364/436; 364/424; 364/565; 235/92 FQ; 324/160; 324/166
[58] Field of Search ............... 364/424, 426, 436, 200, 364/900, 565; 235/92 TC, 61 S, 61 T, 61 V, 92 FQ, 92 PE; 340/52 R, 32, 52 F, 150, 572; 360/5, 6; 346/25; 324/160, 161, 166

[56] References Cited

U.S. PATENT DOCUMENTS

| 3,099,817 | 7/1963 | Kendall | 364/424 |
| 3,564,523 | 2/1971 | Cavelos et al. | 360/6 |
| 3,757,167 | 9/1973 | Yoshikawa et al. | 324/166 |
| 3,781,824 | 12/1973 | Caiati et al. | 364/900 |
| 3,864,731 | 2/1975 | Callahan | 360/5 |
| 3,898,619 | 8/1975 | Carsten et al. | 340/572 |
| 3,938,092 | 2/1976 | Callahan | 340/150 |
| 4,027,289 | 5/1977 | Toman | 364/900 |
| 4,041,448 | 8/1977 | Noens | 340/32 |
| 4,041,470 | 8/1977 | Slane et al. | 364/426 |
| 4,050,747 | 9/1977 | Ruhnau et al. | 324/166 |
| 4,056,287 | 11/1977 | Gudat | 324/160 |
| 4,067,061 | 1/1978 | Juhasz | 364/424 |
| 4,072,850 | 2/1978 | McGlynn | 364/424 |
| 4,086,632 | 4/1978 | Lions | 364/448 |
| 4,151,466 | 4/1979 | Boyer et al. | 235/92 FQ |
| 4,184,203 | 1/1980 | Skarvada | 364/426 |

Primary Examiner—Charles E. Atkinson
Assistant Examiner—Gary Chin
Attorney, Agent, or Firm—Francis J. Lidd

[57] ABSTRACT

An onboard unit consisting of a tape recorder, and associated data handling components utilized to provide records of vehicular operating information including speed, distance, power level, braking level, traction motor current and other control events. Each quantity is associated with an incremental distance and/or time which is fixed. In the case of a rail guided vehicle, location signals provided by ground mounted markers are also recorded. Summation of incremental distances as determined from each marker provides an exact location. A magnetic tape unit provides both data storage and operations instruction for a microprocessor based system, allowing convenient alteration or variations in unit function without internal modification. Each unit retains a unique non-volatile serial number which is transferred to each tape allowing convenient correlation of recorded tapes to onboard units.

8 Claims, 10 Drawing Figures

VEHICULAR DATA HANDLING AND CONTROL SYSTEM

BACKGROUND OF THE INVENTION

This invention relates generally to operation of large vehicles such as locomotives, transit cars, and off-the-road vehicles. In particular, the invention contemplates an on board unit utilizing a system for accumulating and processing operational information relative to the vehicle or vehicles containing the unit.

The operation of large vehicles such as diesel electric locomotives requires control of a large number of quantities vital to satisfactory, economic, and safe operation. This invention provides the means for monitoring quantities for immediate and subsequent evaluation. In particular, when used in a locomotive, speed at a particular track location is essential to analyzing operation, and in addition, provides valuable records for subsequent use in the case of accidents. There are in addition, a large number of additional operating variables such as service pneumatic brake application, dynamic brake application and magnitude, throttle setting, and others associated with the speed and track location, providing vital indications of operating conditions for a given train.

The advent of higher fuel costs, and locomotive operation at high speeds in remote areas makes it necessary to have information which either assists or leads to analysis of vehicle operation so that on given portion of track, road locomotive operation can be evaluated. A method for utilizing recorded data to provide operating information for an individual vehicle is disclosed in co-pending application Ser. No. 699,075, filed on June 23, 1976, and assigned to the same assignee.

Prior Art Recorders are disclosed in U.S. Pat. Nos. 3,864,731; and 3,938,092, hereby fully incorporated by reference. These units disclose a recorder and a method for utilizing a remote computer for processing the data earlier recorded on board a vehicle. Also incorporated by reference is U.S. Pat. No. 4,041,448 disclosing a track marker system.

The unit disclosed provides a substantial advantage over very early analog recorders utilizing circular charts or magnetic recorders, utilizing individual signal amplitude or frequency. Prior art units recorded data directly on the storage media, thereby limiting the amount and degree of information which can be used for evaluation of vehicular operation.

Furthermore, the prior art recorder provided no direct means for identifying the location of a particular vehicle on its track, except from its relationship from the either end of a known track portion. The prior art approach, therefore requires tedious and complicated methods for processing the basic recorded data so as to be able to relate any of the recorded functions with a particular track location.

An additional, particular shortcoming of these prior art units was the essentially fixed method or scheme for recording a predetermined quantity of events or operational data such as brake applications and throttle position relating to speed and location of the vehicle. Recorded quantities were essentially "built in" to each unit and required substantial system changes to vary recorded quantities.

U.S. Pat. No. 4,072,850 to McGlynn is directed to a vehicle usage monitoring and recording system wherein a microprocessor is installed on board the vehicle. However, although the use of on-board microprocessing in storage is common to this invention as well as the referenced patent, McGlynn's system is limited in two respects. First, the system is adapted to recognize a proper user identification number and actuate an ignition enabling circuit. Secondly, in the environment of rental vehicles, the system is adapted to log mileage and other operative characteristics. McGlynn does not disclose the utilization of an on-board microprocessor system for operating upon locomotive operative characteristics such as covered by the claims in the present invention.

OBJECTS OF THE INVENTION

It is therefore an object of this invention to provide an onboard data handling system which records vehicular operational information in a prescribed mode easily variable from unit to unit.

It is a further object of this invention to provide an onboard data acquisition system utilizing tape storage means for handling the data in a format readily useable by conventional data processing equipment, in a subsequent operation.

It is a still further object of this invention to provide an onboard data processing and recording unit which can also provide operating speed, time and locomotive operational parameters with a continous display.

It is a still further object of this invention to provide an onboard data handling and recording system capable of accumulating, storing and recognizing certain critical values of said data and providing alarm indications to the vehicular operator.

It is an additional object of this invention to provide an onboard data processing system which recognizes critical parameters as they are accumulated and recorded and provides corrective signals to the operator.

It is a further object of this invention to provide an onboard data handling and processing system which is capable of recognizing critical data as it is accumulated and recorded and applies pre-determined corrective action to reduce said critical quantities to acceptable values.

An additional object of this invention is to provide an onboard system capable of measuring speed and controlling power generation and/or braking so that a pre-determined speed or speeds may be maintained for the purpose of decreasing the possible destructive tractive or braking forces due to changing power requirements of a multicar train.

A further object of this invention is to provide an onboard data handling system wherein vehicular speed is determined by measuring wheel speed during groups of wheel rotations, and averaging said measured speed over the overall time of said groups.

An object of this invention is to provide a more accurate display vehicular speed by comparing instantaneous binary coded pre-determined time segments of wheel rotation with pre-determined binary equivalents, and averaging said instantaneous speed for updating a display.

SUMMARY OF THE INVENTION

The unit disclosed herein overcomes the aforementioned difficulties by incorporating additional data processing equipment in unique combination with magnetic tape recording means, displays, and other uniquely indentified quantities along with the vehicular speed signel. In addition, the unit disclosed in this application is capable of recognizing the presence of a marker, located adjacent to the railroad track which although passive in nature, responds periodically to a signal transmitted by the locomotive to provide a signal which is uniquely associated with a particular track location.

A particularly novel feature of this invention is the utilization of pre-recorded command signals or instructions on the magnetic tape. On initial run-in, these instructions establish an operating format for each system. After this format is recorded, subsequent data from the vehicle as received from associated transducers is printed on an adjacent portion of the tape in a format unique to that cartridge. In this way recording and control functions can easily be modified from one unit to another.

In accordance with the invention, therefore, a system disclosed herein utilizes onboard read-only memory, and read-write memory programmed from the tape along with associated transducers and devices interfacing the unit and components of the vehicle in order to accumulate, process, and record vehicular operational data. Certain of the recorded data can be compared with pre-determined standards, and depending on detected differences, corrective signals generated. Alternately, alarm or other signals can be generated to alert or inform vehicle operators of necessary corrective action.

Information is also supplied in a form suitable for optical display. Quantities relating to train operation are therefore continuously and instantaneously available for direct viewing by the vehicle operator.

In a preferred embodiment as disclosed herein, vehicle speed information coming from an axle operated pulse generator provides a basic pulse train for recording vehicle distance and other associated vehicle quantities. Greatly improved accuracy in speed and distance measurement is provided by measuring successive time periods of pulses generated by wheel rotation. A predetermined number of pulse periods is summed, and recorded. The time average of a group of summed periods is determined, and recorded.

Additionally, one embodiment of the system at all times recognizes unique signals from a track mounted transponder. This transponder is disclosed in U.S. Pat. No. 3,898,619 said patent incorporated by reference herein.

Therefore, in operation, the system utilizing a predetermined tape cartridge examines a portion of the tape, utilizes the information contained therein to establish pre-determined decision points, information processing functions and alarm levels, after which the remaining tape is utilized for the recordal of the signals so processed. This recorded data is later analyzed by data processing equipment.

BRIEF DESCRIPTION OF THE DRAWINGS

Other objects and advantages of the invention will become apparent on reading the following detailed description and upon reference to the drawings in which.

DETAILED DESCRIPTION OF THE INVENTION

Figure 1:
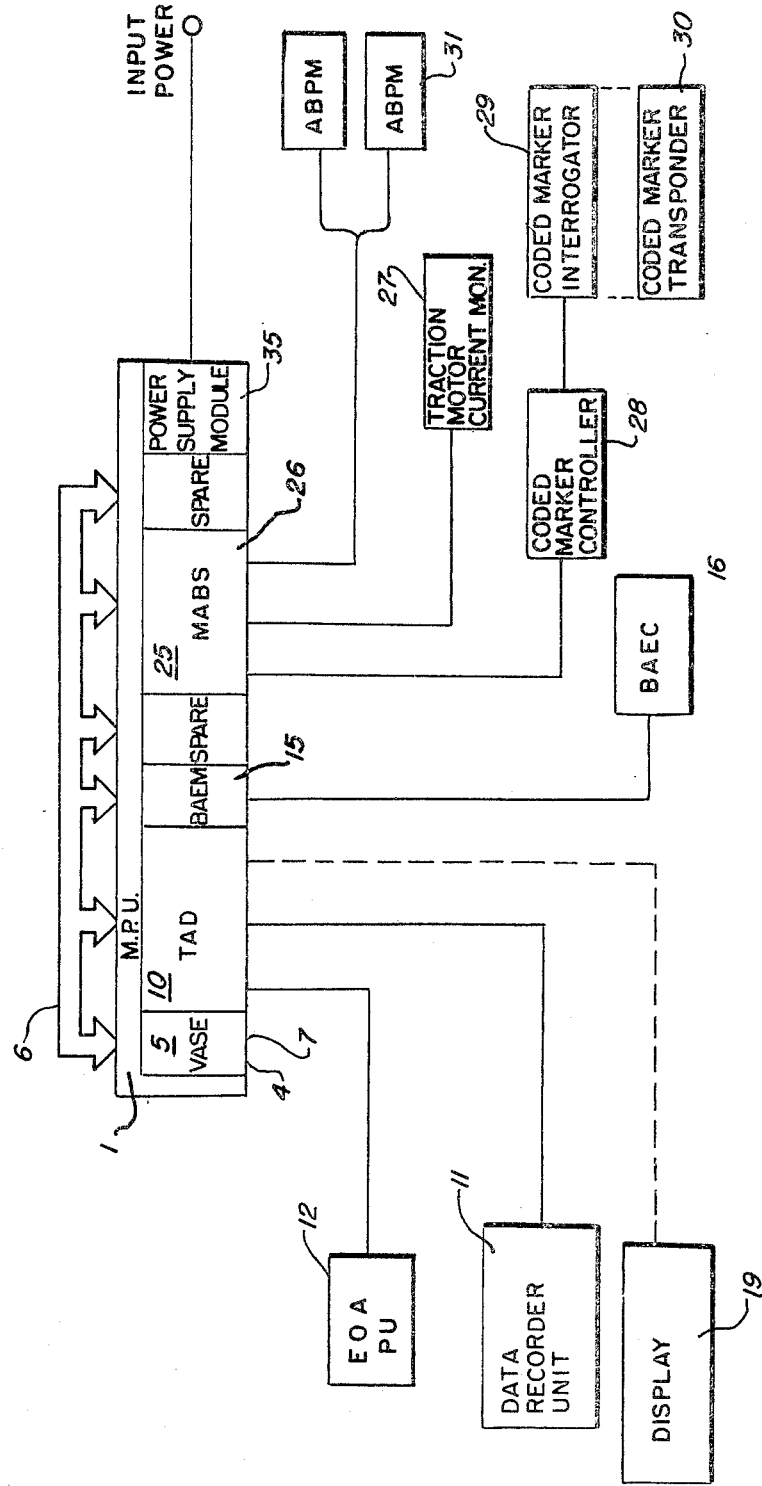
FIG. 1 is a functional block diagram, the unit showing a preferred but not exclusive embodiment.
Figure 2:
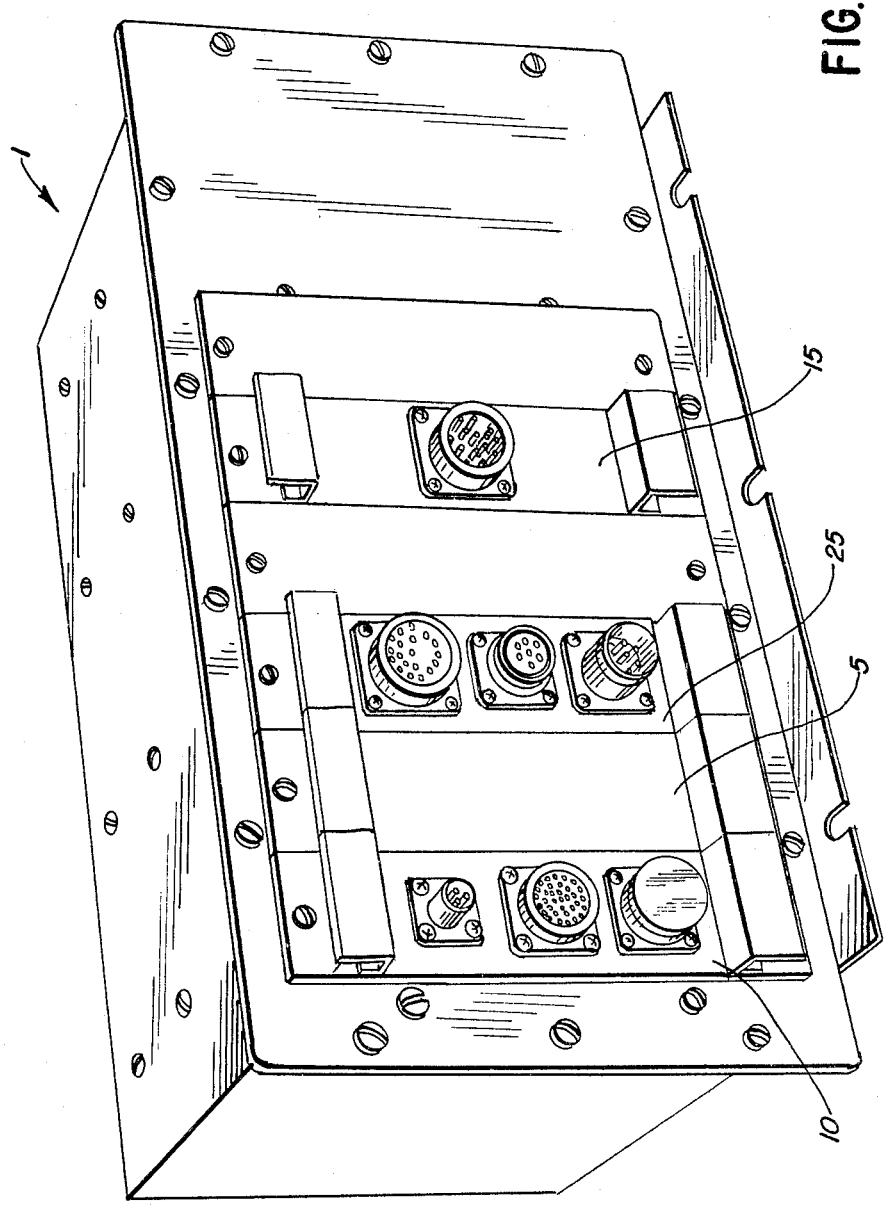
FIG. 2 is the physical configuration of the main processing unit of the preferred embodiment, including the panel layout.
Figure 4:
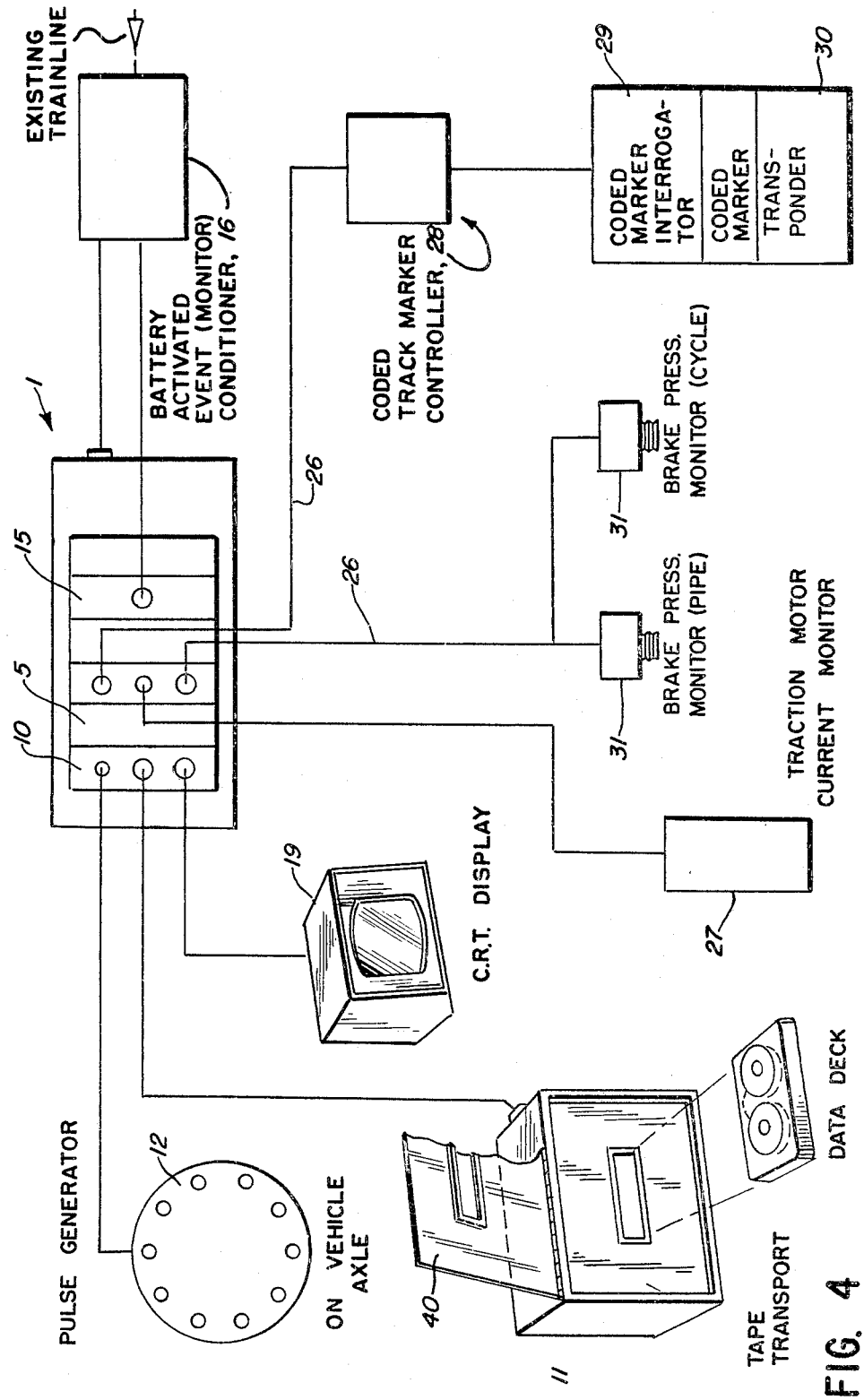
FIG. 4 is a semi-pictorial schematic diagram showing a typical application of the invention on a locomotive, with transducer inputs.

Turning first FIG. 1, FIG. 2, and FIG. 4, the main processing unit (MPU)1, contains the major signal handling and processing modules designated as follows:

The Vapor advance system electronics module (VASE) 5, consisting essentially of a microprocessor such as INTEL 8080A, or equivalent, containing a programmed read-only memory 4 and a random access memory (7). A system bus 6 (within the MPU1) connects all input/output modules such as the TAD 10, MABS 25 and BAEM 15, to the VASE 5, providing continuous intra-communication. Also contained in the MPU are the tape, display, axle unit (TAD) 10 which interfaces the data recorder unit 11, and the end of axle pickup 12 and a display unit 19 to the system bus. The axle pickup provides electrical pulses generated by a designated vehicle wheel.

A battery activated event monitor 15 (BAEM) and battery activated event conditioner 16 (BAEC) are utilized to provide "conditioned" signals from the existing "trainline" control system to the system bus. These trainline signals provide vehicle operation information such as braking and throttle control. In the event of high electrical transient disturbances on these trainlines, the BAEC, and BAEM optically isolate the system bus from these transients.

Continuing on in the main processing unit, the marker, analog to digital, brake, and serial number unit (MABS) 25 provides access to the system bus from various predesignated vehicular information inputs. Those indicated are; airbrakes 26, traction motor current 27, track marker controller 28, and coded market interrogator 29. The latter elements 28 and 29 are essentially described in U.S. Pat. No. 3,898,619 as indicated above and incorporated by reference. A companion unit, the coded marker transponder 30 is indicated in phantom relationship with element 29. The function of these two is as indicated earlier described fully in the above reference patent.

Components of the main processing unit 1 are completed by the power supply module 35 as shown.

Figure 3:
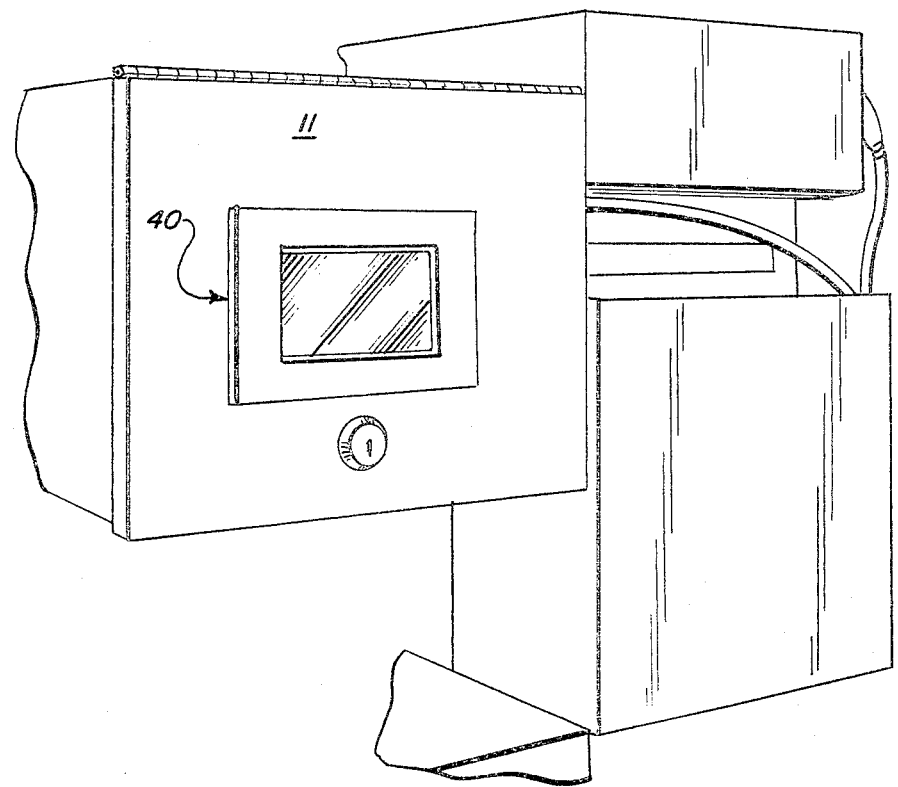
FIG. 3 is a pictorial view of the tape deck and cartridge shown in its relationship to the main processing unit in a typical installation.
Figure 3A:
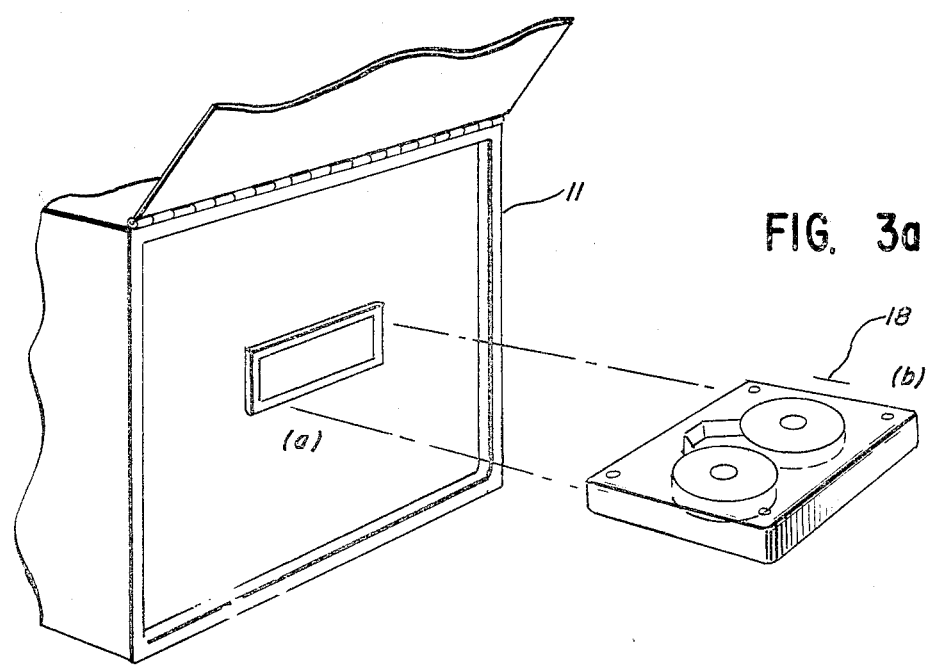
FIG. 3a shows tape cartridge and associated equipment.

In operation, a tape cartridge 18 is inserted in the access area of the data recorder 11, as shown in FIG. 3a. This tape contains data recording space, and a prerecorded set of object instructions for VASE (5) module. Use of this cartridge results in recording these instructions in the random access memory.

To initiate operation, a tape is located through access door 40 (FIGS. 3 and 3a). With the door closed and the power on, the VASE unit 5, initiates a tape cycle via the read only memory. During the tape cycle, pre-recorded instructions are "loaded" into the random access memory in the VASE unit 5.

After loading, the unit is now in a position to record, process, and/or display data. In the event of a stationary vehicle, or motion less than two tenths of a mile per hour, "stop" time, i.e. no distance, is recorded. Any measured quantity that changes, will cause a storage of data in the random access memory, including the elapsed time since the last storage. If 15 minutes passes and no data changes, indication of the elapsed time of 15 minutes will be stored, and the elapsed time counter will be reset for the next count. It should be noted that the concept of data compression on a distance basis disclosed in U.S. Pat. No. 3,864,731, is now applied to events on a time basis. When the random access memory is filled with data, the data is then transmitted via the system bus and the TAD module to the tape. A hard wired serial number unique to each particular MPU is recorded on the tape each time RAM information is dumped or transferred to tape. With the tape in place and functioning, as the vehicle begins operation at speeds greater than two tenths mile per hour, pulses from the axle input 12 are monitored by the tape unit 10 as indicated in above incorporated by reference U.S. Pat. No. 3,864,731.

Figure 6:
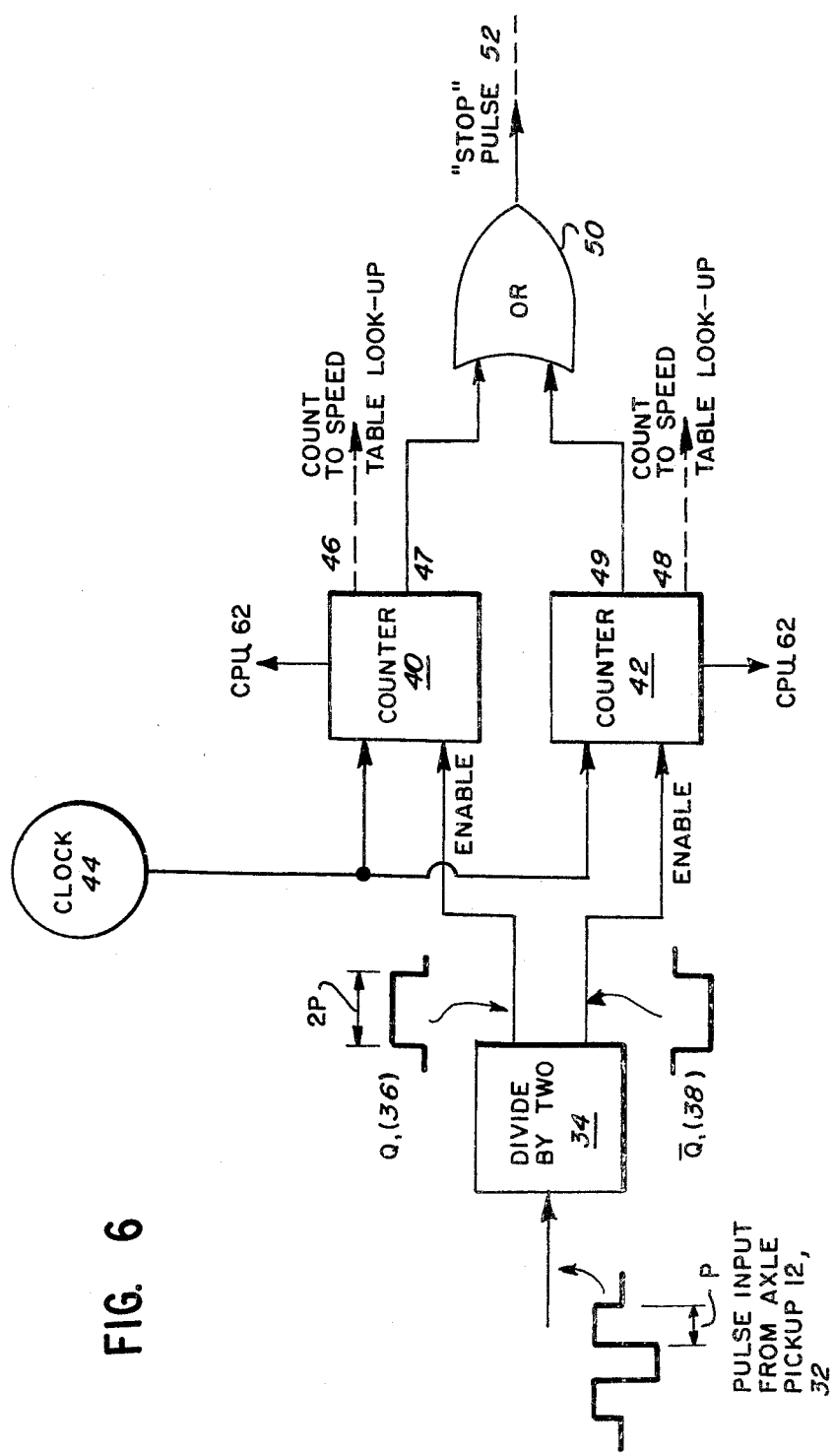
FIG. 6 is a block digital logic diagram showing the novel method of determining speed according to the invention.

In operation, as indicated above, the time based data compression is initiated by the axle pickup generating pulses at a rate of approximately 30,000 per mile of vehicle travel or 60 times for each revolution of a typical vehicular wheel. With reference to FIG. 6, end of axle pulses 32 are applied to a divider stage 34, dividing the pulses and providing pulse 36 the inverse of 36, 38. It should be noted that the width of pulses 36 and 38 is now twice that of the end of axle pulses 32, making the time duration approximately equal to the period of 32.

The high pulse 36 is now applied to counter 40 and the low or not pulse 38 supplied to counter 42. Counters 40 and 42 are driven by the clock 44 contained in the MPU 10. Therefore, pulse outputs 47 and 49 are applied to "or" gate 50 for purposes of generating a stop pulse 52, to be discussed later.

Since counters 40 and 42 are driven by pulses 36 and 38 their registers contain counts of clock pulses during periods enabled by the pulses 36 and 38. Since pulses 36 and 38 are the logical inverse of one another, counters 40 and 42 will be enabled, on alternate periods of a cycle of axle pickup pulses 32. Therefore, the counter registers will contain a measure of the time period of sequential pulses coming from the axle pickup, and therefore are proportional to the speed of the axle during the enabled pulse period.

The registered counts of 40 and 42 are then transferred to the random access memory 7 via the system bus 6, where further communication with an interpolating table lookup program provides an instantaneous binary value of speed during the particular period contained in the counter register. Therefore, utilization of the system described above provides instantaneous measures of the wheel speed on alternate cycles of pulses as measured by the end of axle pickup 32.

These instantaneous speeds are accumulated for approximately one-half wheel revolution or approximately 30 cycles and averaged to provide a final "refined" speed for recording. The averaging process eliminates the effects of eccentricity of the end of axle pickup, and furthermore provides improved accuracy through redundant measurements.

A further advantage of the cumulative time measurement of one-half vehicle wheel revolution provided, as described above, is the availability of a binary coded mileage value for use in updating the display 19. In this case the alternate and sequential values of mileage after averaging are applied to the read-out or display unit providing a recent and accurate value for use within the vehicle.

Returning to FIG. 6, an additional function of the counters 40 and 42 as provided by the application of output pulses 47 and 49 to the "OR" gate 50. As indicated above, the nature of the divide pulses 36 and 38 enables counters 40 and 42 on alternate one-half cycles.

The output of the divide-by-two circuit 34 generates an enable pulse having a duration equal to the period of the pulse input to the circuit 34. Thus, on alternate half cycles of the output of circuit 34, the respective counters 40 and 42 count clock pulses during an enable period, termination of an enable pulse causing resetting of a respective counter. Accordingly, each counter before being reset carries a count which corresponds with the speed of a vehicle. This is calculated through a table look-up. In the event the vehicle stops, one of the counters 40 or 42 will be constantly enabled, thereby achieving an overflow condition for a respective counter. Such a condition results in presenting the "overflow" pulses to only one input of OR gate 50 so that stop pulses are generated at the output of the gate as shown in FIG. 6.

The "STOP" pulses are then further stored in the random access memory for periodic transfer to the tape storage. The concept of averaging sequential pulse account periods provides an additional and novel "STOP" pulse which is utilized to store and record periods of vehicle inactivity. This information is highly valuable in vehicle management.

Functioning in a manner similar to that indicated in U.S. Pat. No. 3,864,731, internally contained clocks, gates and registers result in generating speed and distance signals corresponding to the vehicular speed in miles per hour.

In keeping with the invention, the unit disclosed herein performs these functions under control of the VASE 5. Techniques of signal identification, comparison with prior quantities, generation of print function are performed by the internally stored program of the VASE 5. The signal is further processed by the tape axle display unit TAD 10 and stored in scratch pad memory. A second series of pulses is further converted into vehicle speed, and the first and second speeds are compared. If these speeds do not vary by more than a prescribed amount the speed measuring cycle continues until a speed variation of greater than a prescribed amount or a distance interval greater than a prescribed amount is reached. At this time, the latest speed signal is stored in random access memory for later recording on the tape cartridge.

Figure 5:
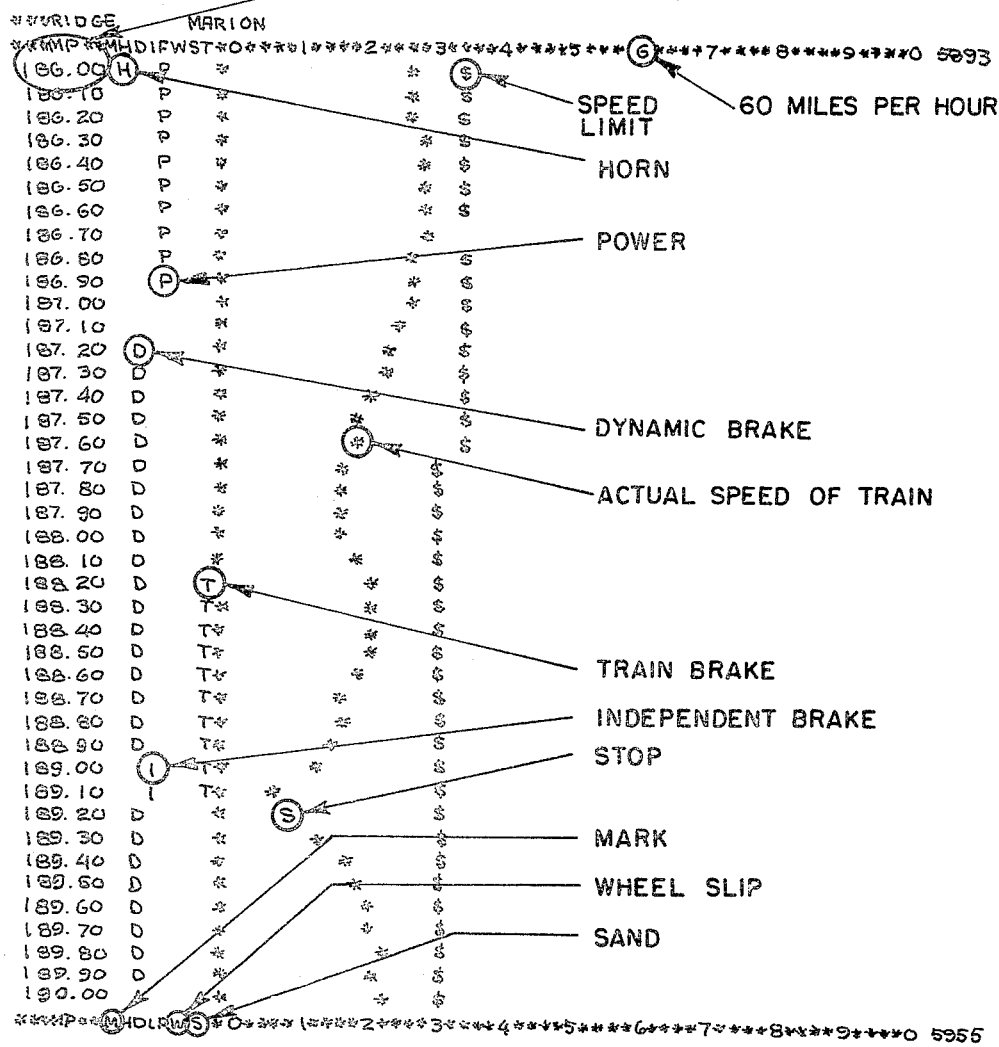
FIG. 5 is a typical operational profile of vehicle operation, constructed from data recorded according to the invention.

If in the initial setup of the processor, it was desired to measure other locomotive operating parameters such as accumulated distance, traction motor current, air brake application, or others, these quantities, interfaced in a manner as described above, will also be recorded coinciding with speed and distance. The events of quantities shown on FIG. 1, FIG. 4, and FIG. 5, are interfaced to the main processing unit 1, through their individual transducing elements, as described above. As shown, use of the disclosed unit to record the above quantities, typically includes air brake pressure monitors 31, and and traction motor current transducer 27. Other quantities would be measured in a similar manner. Therefore, all predetermined quantities have been made available to the main processing unit, and if desired, recorded at a pre-determined interval of distance and/or time.

It should be pointed out that the pre-determined program "loaded" into the random access memory can also be made responsive to pre-determined levels of any of the input quantities or combinations. Recording can be effected providing values of speed, distance, and airbrake applications, or traction motor current, or pre-designated distance along the track as indicated by the mileage recorded or track transponder. Therefore, for a given vehicle it is possible to obtain a recording of a "profile" of operating information allowing a subsequent evaluation of the unit performance either for maintenance or other functional purposes. A typical profile is shown in FIG. 5.

An additional concept of vehicular operation contemplated by the invention involves the utilization of the recorded quantities measured for along with other data such as a locomotive speed or throttle position to determine a real time corrective signal to be applied to the vehicle, in order to maintain a desired speed or rate of change of speed or other quantity, corresponding to a given location on the track. This feature is particularly important in the case of freight trains where it is well known that due to certain grades and/or track conditions present at known locations it is necessary to accelerate, or maintain constant speed of a train in order to prevent derailment or destruction of the car couplers.

Additionally, the invention contemplates annunciating through displays and/or alarms, the occurring of certain pre-determined combinations of measured quantities in the event that it is desired to alert the operator.

As those skilled in the control art will readily recognize, the types of operating instructions which can be programmed read-only memory in the VASE module and/or the random access memory located in the VASE module, essentially provide the capability for any modes of control or derived readout quantities. These include acceleration, rate of change of acceleration, excessive dynamic braking, excessive pneumatic service braking, and the like.

The concept of data recording, processing and vehicular interfacing contemplated and disclosed provides vehicle operators with a tremendously valuable, operational device which allows economic, safe, and easily varied information retrieval, and/or control of vehicular operation.

Thus it is apparent that there has been provided in accordance with the invention, data handling and recording equipment that fully satisfies the objects, aims, and advantages set forth above. While the invention has been described in conjection with a specific embodiment providing a best mode of operation, any variations will be apparent to those skilled in the locomotive and control arts in light of the description. Accordingly, it is intended to embrace all such alternatives or modifications as fall within the spirit and scope of the claims.

Figure 7:
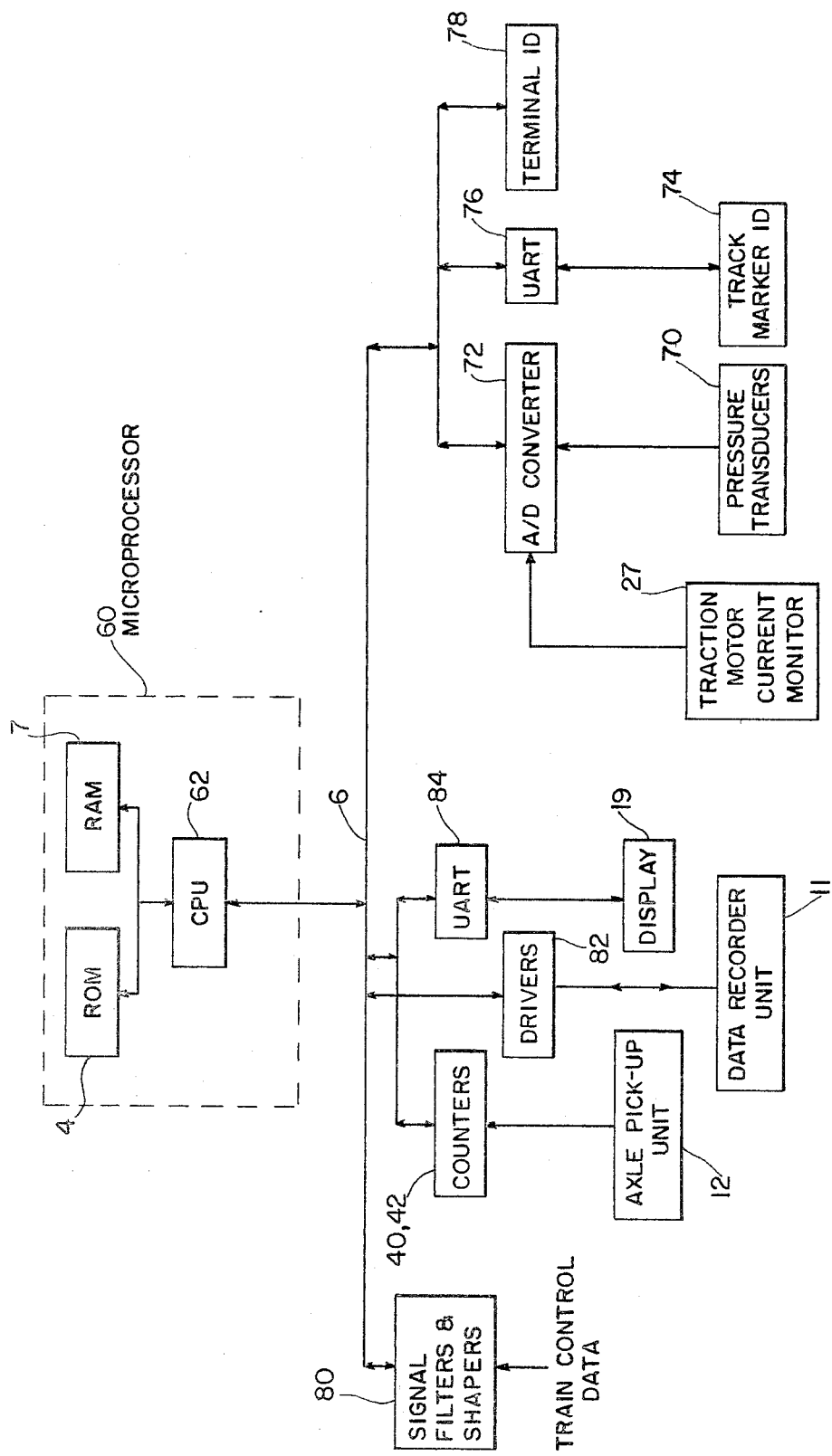
FIG. 7 is a further block diagram showing the functional units of the invention from another perspective.

Referring to FIG. 7, a block diagram of the inventive system is shown with the reorganization of the components shown and described in connection with FIG. 1. The microprocessor 60, previously mentioned in connection with VASE 5 has the ROM 4 and RAM 7 connected with a central processing unit (CPU) 62 in a conventional manner. The CPU communicates with a system bus 6 for processing data from a number of different input sources. A first set of such input sources produce analog information which must be converted to digital form so that the microprocessor 60 may operate upon them. For example, pressure transducers 70 sense application of a vehicle's (e.g., locomotive) air brakes with analog information derived therefrom being converted by a conventional A/D converter 72. This information is then fed to the microprocessor 60 along system bus 6. The previously mentioned traction motor current monitor 27 also furnishes analog information to the A/D converter 72 and the converted data is then made available to the microprocessor 60 along system bus 6.

Track marker identification 74, previously identified in connection with U.S. Pat. No. 3,898,619 and discussed in connection with coded marker components 28–30, undergoes a serial-parallel conversion of data by a conventional UART 76. The UART is used to reformat the data in a form acceptable by the microprocessor 60 and a UART (universal synchronous receiver/transmitter) is commonly used in data acquisition systems, as described in the previously mentioned McGlynn patent.

In order for recorded data to correspond with a particular station or terminal used on a locomotive, an identification number is given to the terminal. This identification number is stored in the RAM 7 of the microprocessor 60 so that all recorded data can be connected with the particular terminal and its corresponding locomotive.

Train control data such as signals from a locomotive throttle control can be monitored. This train control data is of the type derived from electrical components which ordinarily exist on board a locomotive, such as control relays. The signals appearing therefrom must be "cleaned up" by conventional signal filters and shapers 80 so that communication of the train control data may be completed with the system bus 6.

As previously mentioned an axle pick-up unit 12 serves as a transducer for speed determination by storing signals in counters 40, 42 as derived from the axle pick-up unit 12. The previous discussion in connection with FIG. 6 describes the speed determining portion of the inventive system.

Two output devices previously mentioned include a data recorder unit 11 which communicates with microprocessor 60 through line drivers 82. The interconnection between data recorders and a microprocessor is well established in the art. The purpose of the data recording unit 11 is to store data, derived from the previous input devices, as such data changes and is stored in the RAM 7. The ROM 4 does not store such data but rather stores the inalterable instructions for the CPU 62, as in the case of the previously mentioned McGlynn patent. Memory space in the RAM 7 is provided for microprocessor instructions that allow flexible applications by the microprocessor and its associated input-output devices.

A second output device is display 19 which may display any of the collected data stored in RAM 7 by communicating with the microprocessor 60, via the UART 84.

No single component, discussed in connection with FIG. 7 is novel. Rather, it is the particular interconnection of these components and the related handling of locomotive operation data which present a novel invention.

Figure 8:
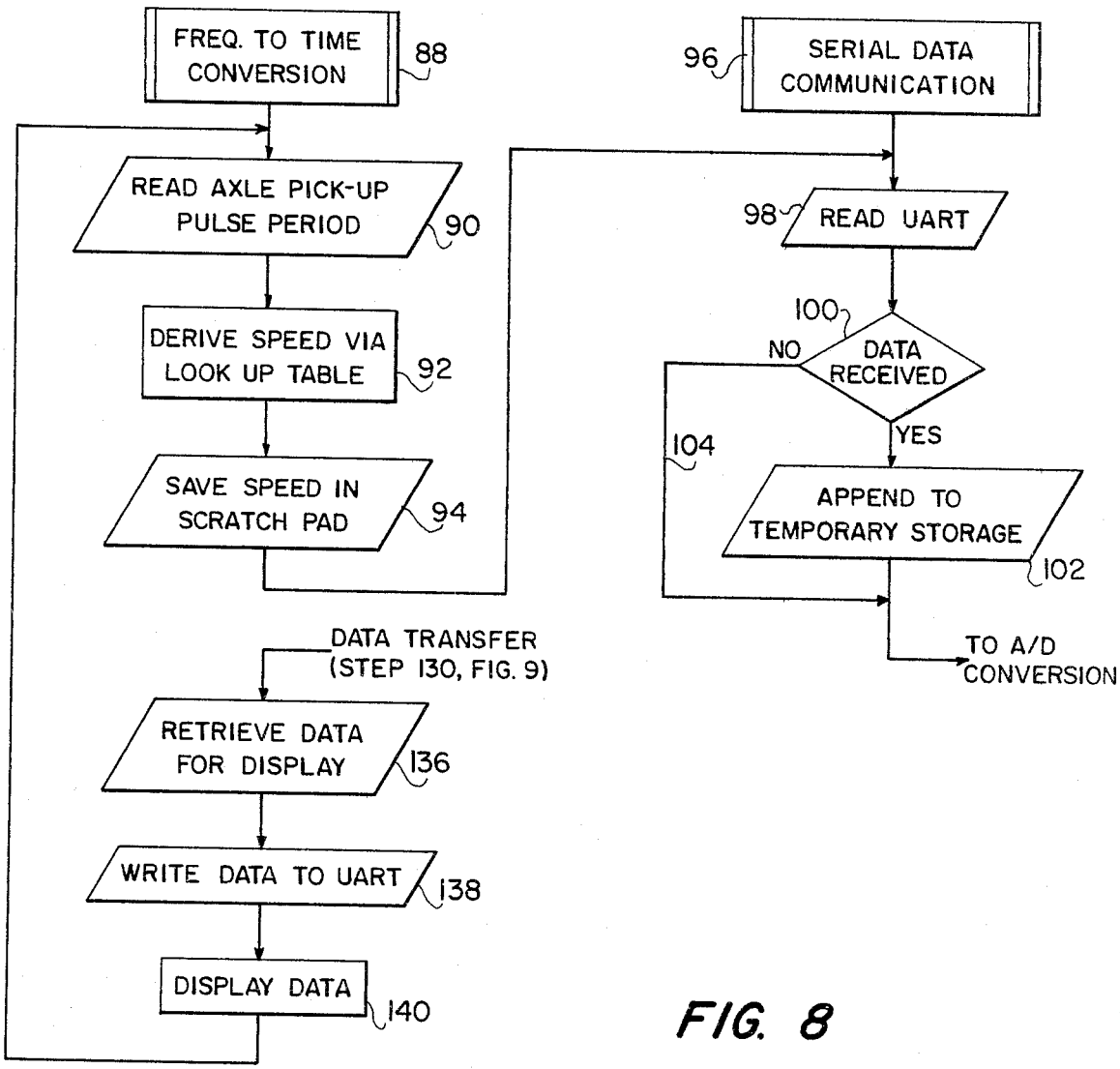
FIG. 8 is a portion of the microprocessor program flow chart as utilized by the present invention.

Microprocessor program flow diagrams in connection with the process for data handling will now be discussed in connection with FIGS. 8 and 9. Referring to FIG. 8, block 88 represents a number of steps to be discussed accomplishing communication between the microprocessor 60 and other hardware of the system for achieving frequency-to-time conversion. The hardware incident to such conversion relates to FIG. 6.

The first step 90, shown in FIG. 8, accomplishes the reading of the pulse period from the axle pick-up unit 12. As discussed in connection with FIG. 6, the corresponding count in counters 40 and 42 are fed to the CPU which then controls the deriving of vehicle speed via a look-up table stored in RAM 7. This is shown by step 92. The results of the speed determination are saved in a "scratchpad" in the RAM 7.

A second derivation of input data deals with serial data communication as indicated by block 96 in FIG. 8 and this corresponds with the inputting of track marker identification from unit 74, as previously explained in connection with FIG. 7. Step 98 indicates that the program proceeds with the reading of the UART at step 98. The microprocessor determines whether data from the marker has been received. If the answer is in the affirmative, the data is appended to temporary storage (step 102) in the RAM 7. In the event that no data has been received from the UART, the program jumps, as indicated by branch 104 to the analog/digital conversion step, to be discussed.

Figure 9:
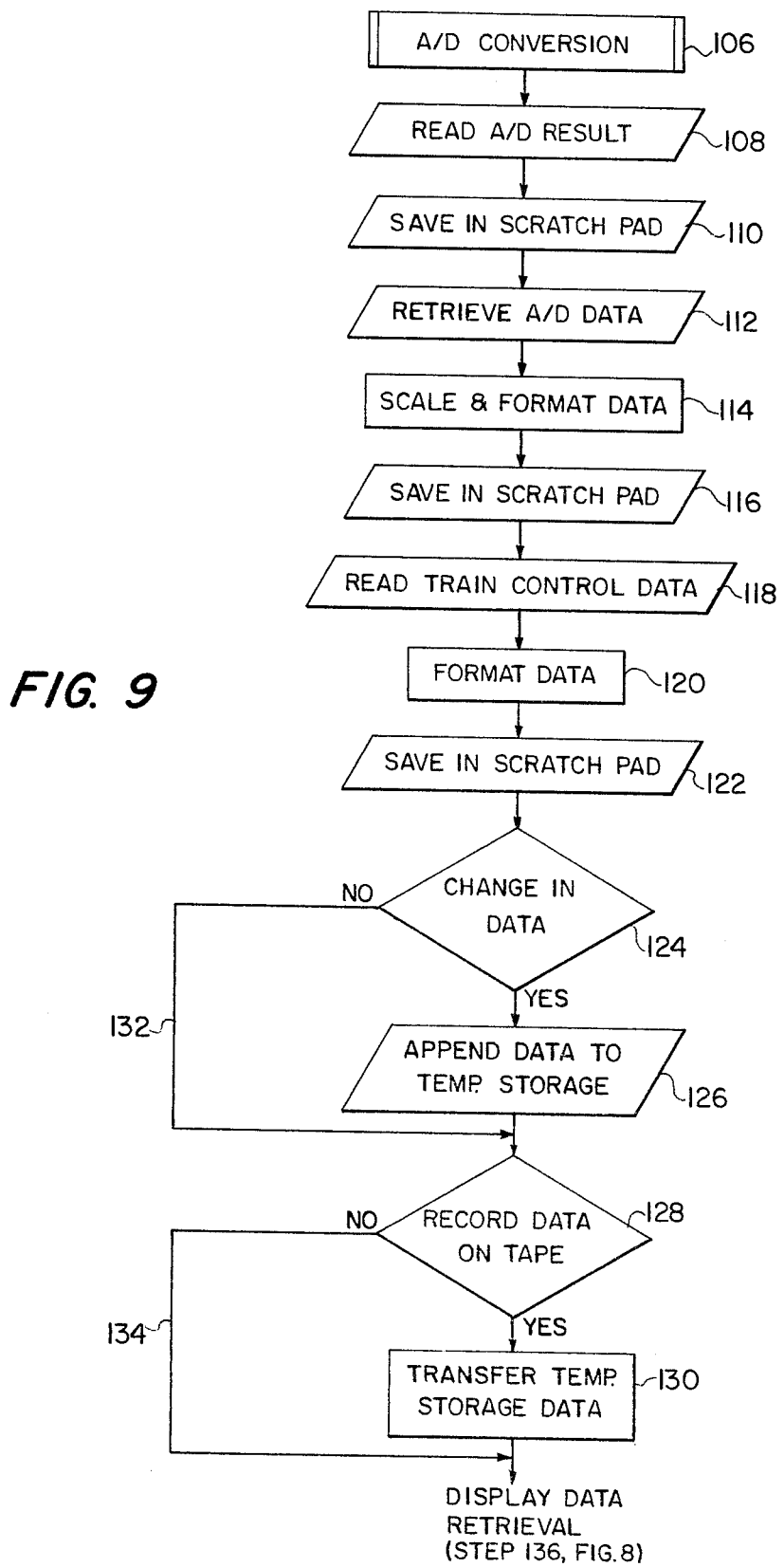
FIG. 9 is the remainder of the microprocessor program flow chart.

Reference to FIG. 9 illustrates the flow chart incident to such an A/D conversion headed by block 106 which signifies that the conversion is performed by hardware and controlled by the steps beginning with 108 wherein an analog-to-digital conversion result is read from converter 72 and saved in "scratchpad" in RAM 7, as indicated by step 110. For the data which requires it, scaling and formatting is accomplished at step 114 after scratchpad retrieval at step 112, and the result therefrom is reintroduced in scratchpad as shown at step 116.

From this point train control data is read, as indicated at step 118. The data, as explained in connection with FIG. 7, undergoes signal filtering and shaping at unit 80 and, as necessary, the read train control data may be formatted, as indicated at step 120 and saved in "scratchpad" (step 122). The scaling and formatting of data requires the storage of sealing parameters in RAM 7.

Thus far, the microprocessor has operated upon input data to derive:

1. vehicle speed from the axle pick-up unit;
2. track marker information; and
3. converted analog data from pressure transducers 70, and the traction motor current monitor 27. Of course, other suitable analog/digital conversions from transducers are considered to be within the purview of the invention.

With continued reference to FIG. 9, the CPU 62 queries the RAM 7 for any changes in data stored in "scratchpad". This is indicated by step 124. If a change is noted, it is appended to temporary storage in the RAM 7 (step 126). If there has been no change, a jump of the program is effected, along branch 132, to the decisional step 128 in the flow chart. During this step, a determination is made as to whether or not the data being operated upon need be recorded onto tape. In the event the answer is affirmative, the data is transferred to temporary storage at step 130 until communication between the data recorder unit 11 and the system bus 6 can be completed. In the event there is to be no recording of the data, the program jumps, as indicated by branch 134, to a subsequent step 136 in FIG. 8.

Referring once again to FIG. 8, step 136 calls for the retrieval of data from RAM 7 for display on the display unit 19 (FIG. 7). Of course, as in the case of conventional display terminals, such display will only occur upon request by an operator. When such a request is made, the data from RAM 7 communicates through the UART 84 (FIG. 7) under program control at step 138 to accomplish the desired display of data at step 140. The program will then loop back to step 90 for a reiteration of the program.

Since elapsed time is easily kept by monitoring the clock 44 (FIG. 6) and since counters 40 and 42 provide the CPU with speed data, a simple computation may be made by microprocessor 60 in the determination of vehicle distance traveled, this data being stored in the scratchpad of RAM 7.

We claim:

1. In a vehicle data acquisition system, a speed determining circuit comprising:

transducer means for generating a first pulse signal having a frequency corresponding to the speed of the vehicle;

means for translating the first pulse signal to a second pulse signal, wherein each pulse of the second pulse signal has a width equal to the period of the first pulse signal;

counting means having a first input thereof connected to a clock and a second input thereof connected to the output of the translating means, the counting means being enabled by the second pulse signal to count clock pulses;

means for connecting the counting means to a microprocessor, the latter performing a "table look-up" procedure for equating a count in the counting means to a corresponding vehicle speed; and means connected to the counting means for detecting a full count therein which is indicative of a vehicle at rest.

2. The subject matter set forth in claim 1 wherein the translating means comprises a "divide-by-two" circuit having first and second output terminals wherein the second pulse signal and its complement appear; and wherein the counting means comprise first and second counters, each enabled by alternate half cycles of the second pulse signal.

3. The subject matter set forth in claim 2 together with gating means connected to the counting means for detecting a full count in either counter signifying that the vehicle is at rest.

4. A method for acquiring locomotive operation data comprising the steps of:

generating a first pulse signal having a frequency corresponding to the speed of a locomotive wheel;

dividing the first pulse signal by two thereby obtaining a second pulse signal;

counting clock pulses for an interval equal to the period of the second pulse signal;

determining measurement data of locomotive speed as a function of a count of clock pulses between pulses of the second pulse signal;

storing the measurement data;

detecting a preselected count indicative of a locomotive at rest; and storing the occurrence of the rest.

5. The method of claim 4 together with the steps of:

detecting coded track marker data corresponding to locomotive location; and
storing the marker data.

6. The method set forth in claim 5 together with the steps of reading analog data from transducers;
converting the data to digital form; and
storing the digital data.

7. The method set forth in claim 6 together with the steps of monitoring the measurement, rest, coded track marker and digital data for changes as a function of time, and recording such data which has undergone change.

8. The method set forth in claim 7 together with the steps of retrieving selected data from storage and displaying such retrieved data.

* * * * *